(12) United States Patent
Tu et al.

(10) Patent No.: US 7,957,269 B2
(45) Date of Patent: Jun. 7, 2011

(54) METHOD AND SYSTEM FOR SYNCHRONIZATION OF PACKET

(75) Inventors: Boyan Tu, Shenzhen (CN); Rajesh Shetty, Shenzhen (CN); Pradeepa Mattur Mahabala Shastry, Shenzhen (CN); Hanjun Luo, Shenzhen (CN); Yuan Yao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 255 days.

(21) Appl. No.: 12/360,939

(22) Filed: Jan. 28, 2009

(65) Prior Publication Data

US 2009/0219931 A1    Sep. 3, 2009

Related U.S. Application Data

(63) Continuation of application No. PCT/CN2007/001766, filed on Jun. 4, 2007.

(30) Foreign Application Priority Data

Jul. 28, 2006  (CN) .......................... 2006 1 0103939

(51) Int. Cl.
 *G01R 31/08* (2006.01)
(52) U.S. Cl. ........ 370/220; 370/217; 370/219; 370/223; 370/230; 370/419; 714/4; 714/6; 714/15; 714/43
(58) Field of Classification Search .................. 370/217, 370/218, 219, 220, 223, 225, 230, 392, 395.4, 370/419; 714/4, 6, 15, 43
See application file for complete search history.

(56) References Cited

U.S. PATENT DOCUMENTS

| | | | |
|---|---|---|---|
| 6,253,334 B1 * | 6/2001 | Amdahl et al. | 714/4 |
| 6,853,617 B2 * | 2/2005 | Watson et al. | 370/218 |
| 6,910,148 B1 * | 6/2005 | Ho et al. | 714/4 |
| 6,934,875 B2 | 8/2005 | Kashyap | |
| 7,085,226 B1 | 8/2006 | Jung et al. | |
| 7,269,133 B2 * | 9/2007 | Lu et al. | 370/219 |
| 7,295,566 B1 * | 11/2007 | Chiu et al. | 370/419 |
| 7,406,035 B2 * | 7/2008 | Harvey et al. | 370/218 |

(Continued)

FOREIGN PATENT DOCUMENTS

CN             1437348 A       8/2003
(Continued)

OTHER PUBLICATIONS

International Search Report issued in corresponding PCT Application PCT/CN2007/001766; mailed Sep. 13, 2007.

(Continued)

*Primary Examiner* — Ayaz R Sheikh
*Assistant Examiner* — Andrew C Lee
(74) *Attorney, Agent, or Firm* — Slater & Matsil, L.L.P.

(57) ABSTRACT

A message synchronization demarcation method includes: a backup board receives a message of an opposite terminal from an interface board; the message is copied to a main board; the main board processes the message, copies it to the backup board through the buffer unit and transmits the data. Also a message synchronization demarcation system is provided. The data backup between the main board and the backup board is performed through the buffer area without occupying the transport layer resource, so the data flux of communication channels is reduced, the payload is lowered, and the backup steps of messages between the main board and the backup board is simplified. Using the present disclosure, the received message can be demarcated, and the accuracy of message transmission is further improved.

13 Claims, 5 Drawing Sheets

U.S. PATENT DOCUMENTS

| | | | |
|---|---|---|---|
| 7,515,525 B2* | 4/2009 | Appanna et al. | 370/217 |
| 7,623,444 B2* | 11/2009 | Ra et al. | 370/220 |
| 7,739,403 B1* | 6/2010 | Balakrishna et al. | 709/242 |
| 7,751,312 B2* | 7/2010 | Benayoun et al. | 370/219 |
| 7,770,062 B2* | 8/2010 | Koike | 714/12 |
| 2002/0064132 A1* | 5/2002 | Akyol et al. | 370/250 |
| 2002/0176355 A1* | 11/2002 | Mimms et al. | 370/216 |
| 2003/0076778 A1* | 4/2003 | Lee | 370/225 |
| 2004/0042395 A1* | 3/2004 | Lu et al. | 370/225 |
| 2004/0078619 A1* | 4/2004 | Vasavada | 714/4 |
| 2004/0268175 A1 | 12/2004 | Koch et al. | |
| 2005/0226144 A1* | 10/2005 | Okita | 370/219 |
| 2006/0072480 A1* | 4/2006 | Deval et al. | 370/254 |
| 2008/0159325 A1* | 7/2008 | Chen et al. | 370/432 |

FOREIGN PATENT DOCUMENTS

KR    20020053956 A    7/2002

OTHER PUBLICATIONS

Alvisi, L. et al., "Wrapping Server-Side TCP to Mask Connection Failures," Proceedings of the Twentieth Annual Joint Conference of the IEEE Computer and Communications Societies (INFOCOM 2001), vol. 1, Apr. 22-26, 2001, Ankorage, Alaska, 9 pages.

Marwah, M., et al., "TCP Server Fault Tolerance Using Connection Migration to a Backup Server," Proceedings of the IEEE International Conference on Dependable Systems and Networks (DSN 2003), Jun. 22-25, 2003, San Francisco, California, 10 pages.

Written Opinion of the International Searching Authority, International Application No. PCT/CN2007/001766, Applicant: Huawei Technologies Co., Ltd., et al., Date of mailing: Sep. 13, 2007, 6 pages.

Chinese Office Action, Chinese Application No. 200780000172.7, Dated: Nov. 12, 2010, 9 pages.

* cited by examiner

METHOD AND SYSTEM FOR SYNCHRONIZATION OF PACKET

CROSS REFERENCE TO RELATED APPLICATIONS

This application is a continuation application of PCT/CN2007/001766, filed on Jun. 4, 2007, which claims the priority of Chinese Patent Application No. 200610103939.6, entitled "METHOD FOR BACKUPING A PACKET" and filed on Jul. 28, 2006, both of which are incorporated herein by reference in its entirety.

FIELD OF THE DISCLOSURE

The present disclosure relates to the technical field of information and communication, in particular, to a method and a system for synchronization of a packet.

BACKGROUND OF THE DISCLOSURE

During data communication, an active board is protected by a standby board. When an application fails in the active board, the standby board should be able to detect the error quickly and take over the routing service seamlessly.

In the prior art, the method for packet backup is an explicit real-time backup. In other words, the interface board only sends a peer packet to the active board, and the active board backs up all the processing results to the standby board in real time after processing the peer packet.

However, because an explicit real-time backup is used in the prior art, in particular, the active board needs to receive a packet, process the packet, back up the packet to the standby board and send the packet, thus the burden of the active board is too heavy, and in the case of heavy load, the communication between the processes may be unreliable. Moreover, all the data processed by the active board have to be backed up to the standby board via the transport layer. Therefore, the load of the communication channel between processes may be too heavy.

To implement an implicit backup, the other method for packet backup in the prior art is as follows:

An interface board sends a peer packet to the standby board;

The packet is duplicated to the active board;

The active board processes the packet and feeds back the processing result to the standby board; and The standby board backs up and sends the result.

In this solution, the load of the active board may be reduced and the communication reliability may be improved. However, although the packet is received and sent by the standby board, the active board still needs to duplicate a large volume of data to the standby board, which causes an excessive load of the communication channel and deteriorates the communication.

SUMMARY OF THE DISCLOSURE

Embodiments of the present disclosure provide a method and a system for synchronization of a packet to reduce the load of the communication channel caused by the backup between an active board and a standby board.

An embodiment of the present disclosure provides a method for synchronization of a packet, the method includes: a standby board receives a peer packet from an interface board; the standby board duplicates the peer packet to an active board; the active board processes the peer packet; and the active board backs up the data to the standby board via a buffer and sends the data to the peer end.

An embodiment of the present disclosure provides a system for synchronization of a packet, which includes an active board and a standby board. A buffer is provided in the active board and the standby board respectively, for caching the packet data between the active board and the standby board. The standby board is adapted to receive a peer packet from an interface board and duplicate the peer packet to the active board. The active board is adapted to process the packet duplicated from the standby board, send the packet data to the buffer for storing, and back up the data to the standby board and send the data.

BRIEF DESCRIPTION OF THE DRAWINGS

The disclosure may be further illustrated with reference to the drawings which constitute a part of the application. The embodiments of the disclosure and the illustration thereof are only used for explaining the disclosure rather than limiting the disclosure. In the drawings.

DETAILED DESCRIPTION OF THE EMBODIMENTS

The embodiments of the disclosure will now be illustrated in detail in conjunction with the drawings.

An embodiment of the disclosure provides a method for synchronization of a packet, by means of which the load of the communication channel caused by the backup between the active board and the standby board may be lowered.

Figure 1:
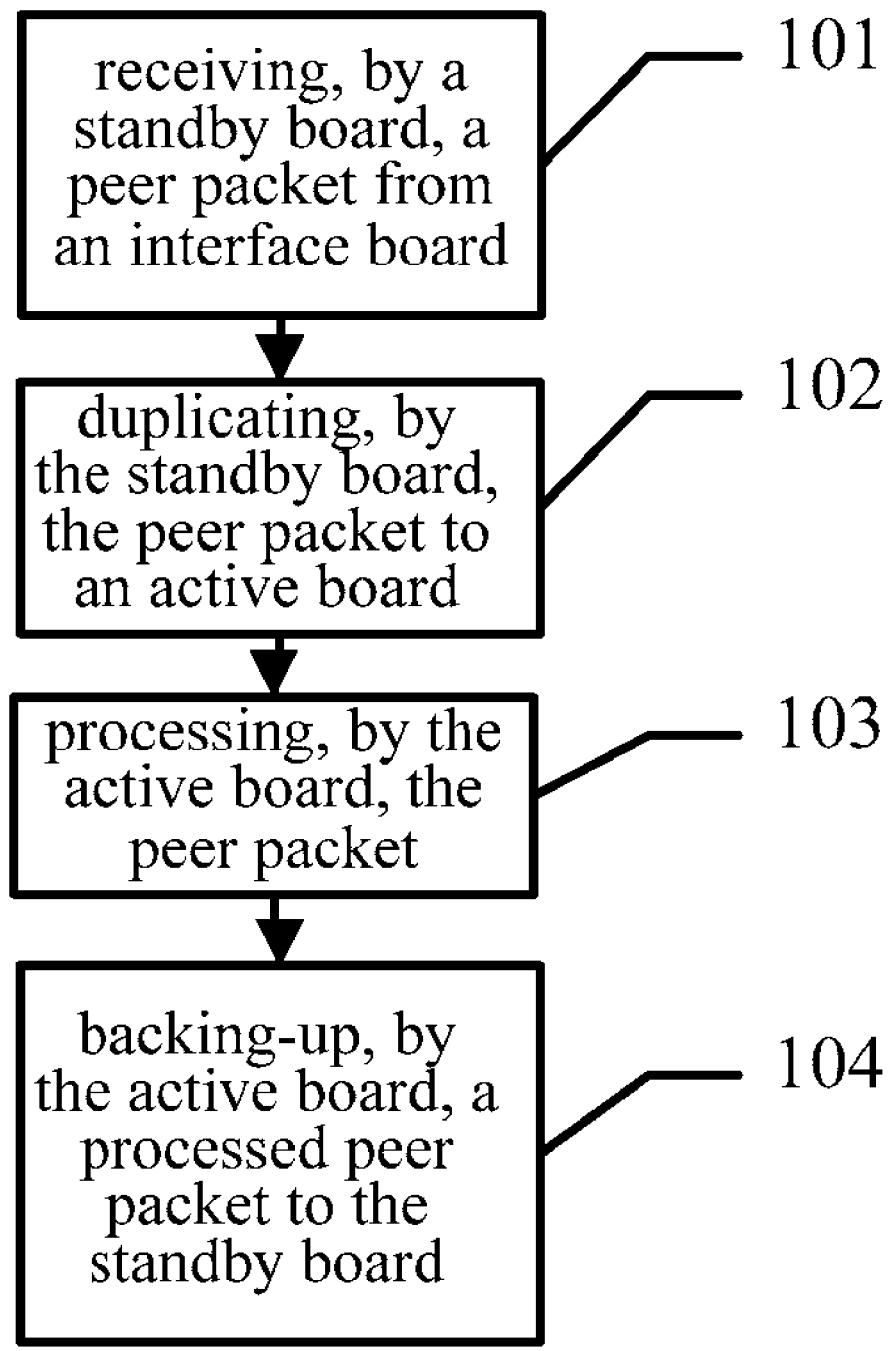
FIG. 1 is a flow chart of the method for synchronization of a packet according to a first embodiment of the disclosure.

Referring to FIG. 1, the method for synchronization of a packet according to a first embodiment of the disclosure includes:

in block 101, receiving a peer packet, in particular, the standby board receives a peer packet from an interface board;

in block 102, duplicating to the active board, in particular, the standby board duplicates the peer packet received to the active board;

in block 103, processing the packet, in particular, the active board processes the peer packet from the standby board; and in block 104, backuping and sending, In particular, the active board backs up the data to the standby board via a buffer; when sending the packet, a socket first delivers the data to a buffer, and the buffer backs up the data to the standby board. With acknowledge of the standby board, the buffer of the active board delivers the data into the socket for sending, and an application in the active board sends the data to the interface socket.

The method for synchronization of a packet according to the embodiment of the present disclosure may be applied to both connection-oriented applications and connectionless applications, which will be described respectively below, in which TCP is used as an example of the connection-oriented protocol, and UDP/raw Internet Protocol (IP) is used as an example of connectionless protocol.

Figure 2:
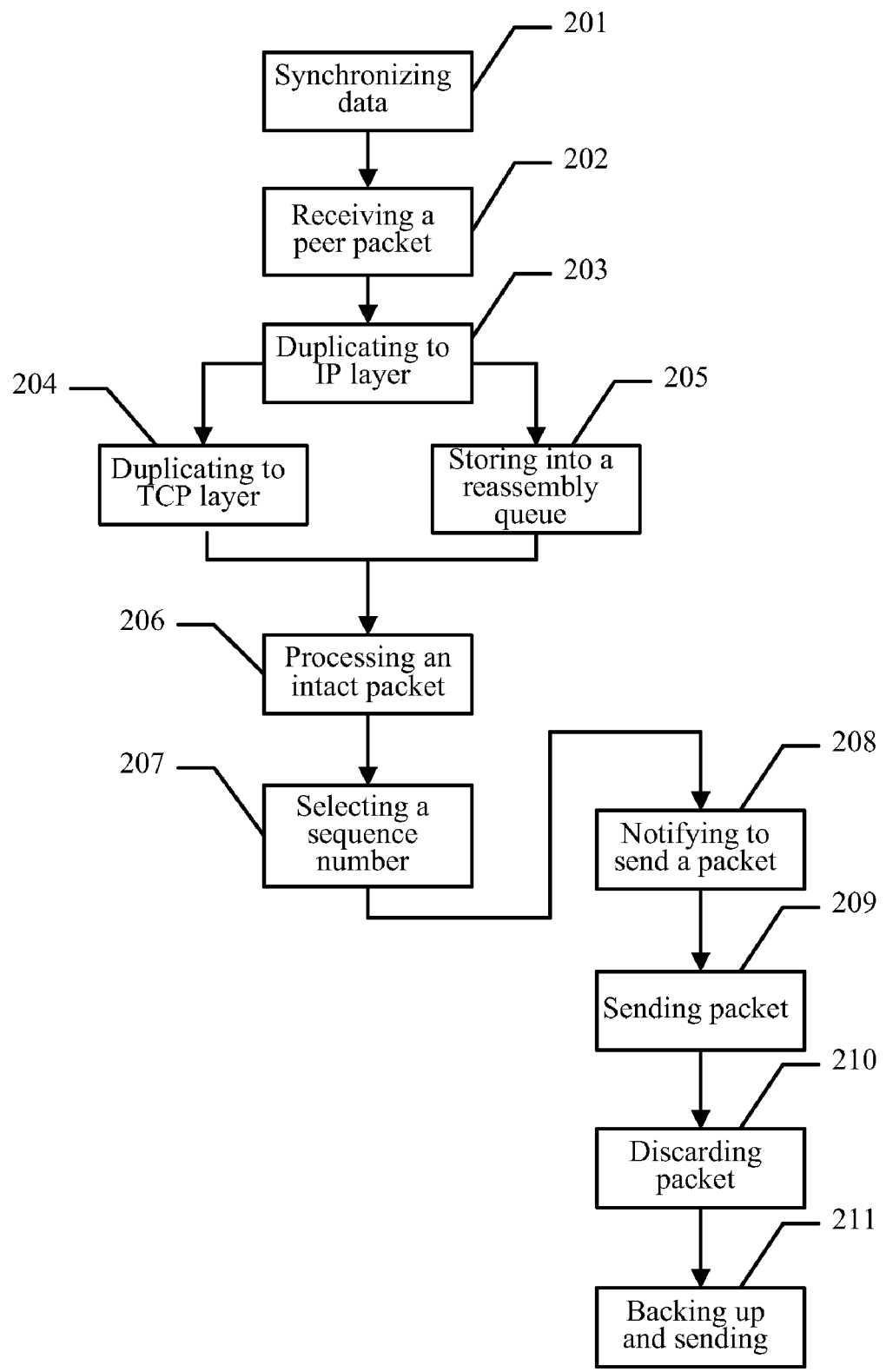
FIG. 2 is a flow chart of the method for synchronization of a packet according to a second embodiment of the disclosure.

Now a connection-oriented application is described. The method for synchronization of a packet according to a second embodiment of the present disclosure is shown in FIG. 2, including:

in block 201, synchronizing the Data,

In particular, the data on the standby board and the active board are synchronized by duplicating data in batches to the standby board from the active board which is an explicit backup here;

in block 202, receiving a peer packet,

In particular, when the duplication in batches completed, the standby board receives the peer packet from the interface board;

in block 203, duplicating to IP layer,

In particular, the IP layer of the standby board duplicates the packet to the IP layer of the active board;

in block 204, duplicating to TCP layer,

In particular, the IP layer of the active board duplicates the packet from the IP layer of the standby board to the Socket/TCP layer of the active board;

in block 205, storing into a reassembly queue,

In particular, the IP layer of the active board duplicates the packet to the Socket/TCP layer of the active board and stores the packet into a reassembly queue simultaneously;

in block 206, processing an intact packet,

In particular, the TCP layer of the active board processes an intact packet that arrives via the standby board;

in block 207, selecting a sequence number,

In particular, the TCP layer of the active board selects a larger sequence number between the sequence number of the next expected packet and the maximum sequence number of the packet in the reassembly queue, and records the sequence number;

in block 208, notifying to send a packet,

In particular, when the connection-oriented application completes reading all the packets the sequence numbers of which lie before the recorded sequence number, the TCP of the active board sends an asynchronous message to notify the application to search the boundary of the application;

When it is ensured that the connection-oriented application notifies, by setting a socket option, the socket layer that an intact packet has been processed, the socket layer of the active board notifies the socket layer of the standby board to send the packet starting from the recorded sequence number;

in block 209, sending a packet,

In particular, the socket layer of the standby board starts to send the peer packet to the application starting from the recorded sequence number;

in block 210, discarding a packet,

In particular, the peer packet of which the sequence number is less than the recorded sequence number is discarded from the socket receiving buffer and the reassembly queue in the socket layer of the standby board; and in block 211, backuping and sending data, In particular, the buffer of the active board backs up data to the buffer of the standby board; when sending a packet, the socket first delivers the packet to a buffer, and the buffer backs up the data to the standby board; after the acknowledge of the standby board, the buffer of the active board delivers the data to the socket for sending, and the active board application sends data to the socket.

This embodiment is directed to the packet backup of a TCP application. During the process of sending a peer packet on the socket layer of the standby board, if a peer packet of which the sequence number is the recorded sequence number presents in the reassembly queue, the peer packet is moved into the socket receiving buffer, till a packet with a discontinuous sequence number appears. If the packet presents in the receiving buffer, the socket layer in the standby board sends an asynchronous signal to notify the application to read the data. Then, the buffer in the standby board starts to send the peer packet to the application; therefore, the application on the standby board may obtain the peer packet by detection.

Figure 3:
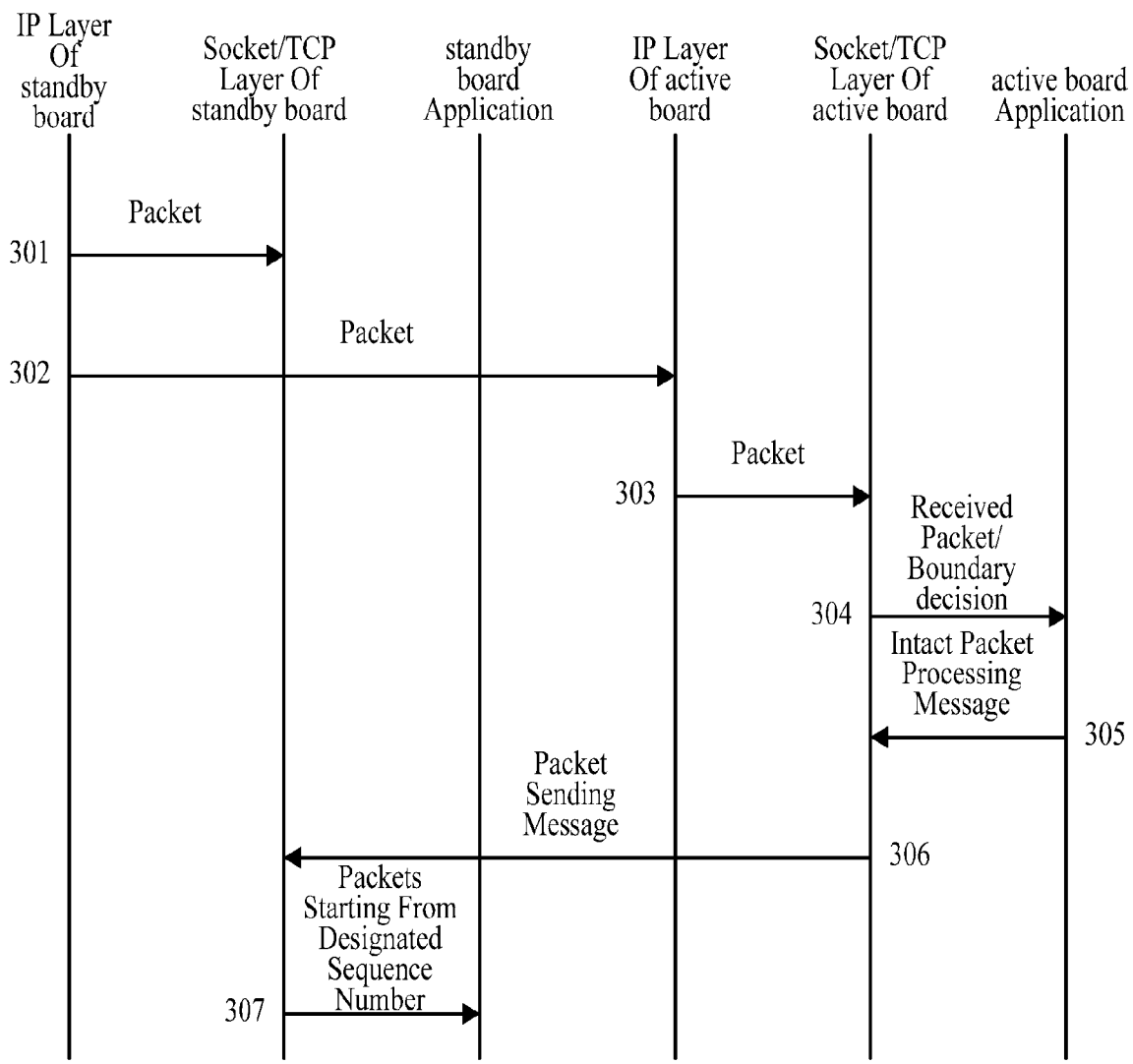
FIG. 3 is a signaling flow chart of the method for synchronization of a packet according to the second embodiment of the disclosure.

FIG. 3 shows the signaling flow of a connection-oriented packet backup, including:

in block 301, the IP layer of the standby board sends a packet to the Socket/TCP layer of the standby board;

In block 302, the IP layer of the standby board sends the packet to the IP layer of the active board;

In block 303, the IP layer of the active board sends the packet to the Socket/TCP layer of the active board;

In block 304, the Socket/TCP layer of the active board sends the received packet to the active board application, and notifies the application to start the boundary decision;

In block 305, after an intact packet is processed, the active board application feeds back an processing message of the intact packet to the Socket/TCP layer of the active board;

in block 306, after receiving the message, the Socket/TCP layer of the active board obtains the boundary sequence number, and notifies the boundary sequence number to the Socket/TCP layer of the standby board for sending packets; and In block 307, the Socket/TCP layer of the standby board discards the packets before the boundary sequence number, and delivers the packet starting from the boundary sequence number to the standby board application.

The detailed process is as follows:

After the batch backup is completed, the interface board sends the peer packet to the standby board. The peer packet from the interface board may be sent to the standby board. The IP layer on the standby board may duplicate the packet to the IP layer in the active board. The TCP layer on the standby board may put the received packet into a reassembly queue without sending any asynchronous signal to notify the application that a new packet arrives.

The IP layer in the active board sends the packet to the TCP layer. The TCP layer in the active board may put the received packet into a reassembly queue and send a synchronization signal to notify the application that a new packet arrives. When finished processing an intact packet that arrives via the standby board, the TCP layer in the active board may select a larger sequence number between the sequence number of the next packet expected currently and the maximum sequence number of the packet in the reassembly queue, and record the sequence number. When the connection-oriented application finishes reading all the packets of which the sequence number is before the recorded sequence number, the TCP layer may send an asynchronous signal to notify the application to search the boundary of the application, and the application is ready for making the boundary decision.

When a connection-oriented application, such as a Border Gateway Protocol (BGP) or a Label Distribution Protocol (LDP), receives an intact BGP or LDP packet, which means the boundary, has been found, the packet may not be further read from the socket layer until the socket layer is notified that an intact packet has been processed by setting a socket option.

After the boundary is found, the connection-oriented application should back up all the packets before this point, and guarantee the states of the applications in the active board and the standby board are the same. After it is ensured that the connection-oriented application notifies the socket layer that an intact packet has been processed by setting a socket option, the socket layer of the active board notifies the socket layer of the standby board to deliver the packet starting from this sequence number during processing of the socket option, and delete all the buffered packets before this sequence number.

The socket layer in the standby board delivers to the application the peer packet starting from the sequence number, and discards the peer packet, the sequence number of which is less than the sequence number, from the socket receiving buffer and the reassembly queue.

If a peer packet of which the sequence number is said sequence number presents in the reassembly queue, the peer packet is moved into the socket receiving buffer, till a packet with a discontinuous sequence number appears. If data presents in the receiving buffer, the socket layer in the standby board sends an asynchronous signal to notify the application to read the data. Then, the buffer in the standby board starts to deliver the peer packet to the application, so that the application on the standby board may obtain the peer packet by detection.

The connection-oriented method for synchronization of a packet has been illustrated above. Now, the connectionless method for synchronization of a packet will be described, taking UDP/raw IP as an example.

Figure 4:
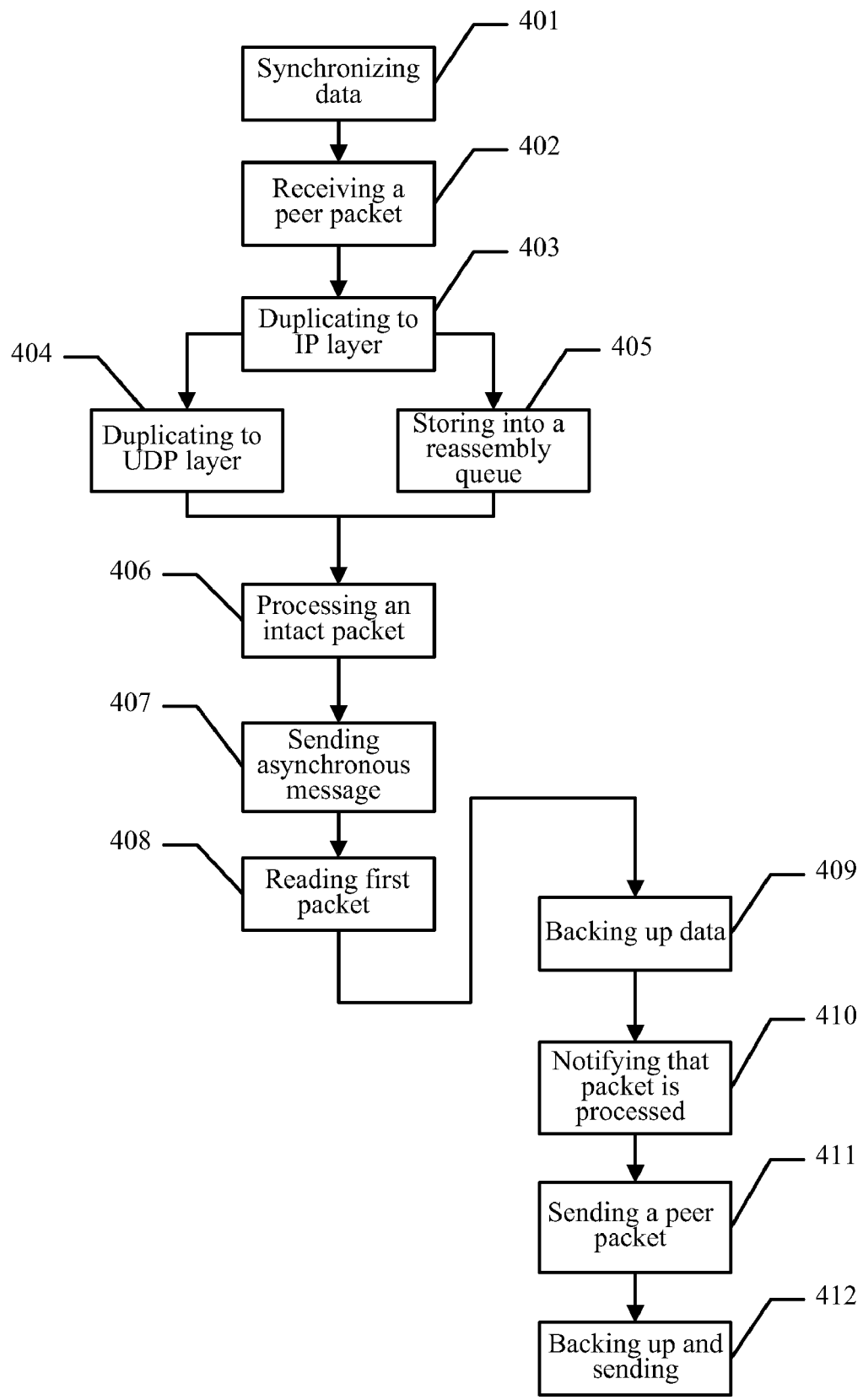
FIG. 4 is a flow chart of the method for synchronization of a packet according to a third embodiment of the disclosure.

FIG. 4 shows the method for synchronization of a packet according to a third embodiment of the present disclosure, including:

in block 401, synchronizing data,

In particular, the data on the standby board and the active board are synchronized by duplicating data in batches from the active board to the standby board which is an explicit backup here;

in block 402, receiving a peer packet,

In particular, after the duplication of data in batches finishes, the standby board receives the peer packet from the interface board;

in block 403, duplicating to the IP layer,

In particular, the IP layer of the standby board duplicates the packet to the IP layer of the active board;

in block 404, duplicating to the UDP or raw IP layer,

In particular, the IP layer of the active board duplicates the packet from the IP layer of the standby board to the UDP or the raw IP layer of the active board;

in block 405, storing into a reassembly queue,

In particular, the IP layer of the active board duplicates the packet to the UDP or the raw IP layer of the active board and stores the packet in a reassembly queue simultaneously;

in block 406, processing an intact packet,

In particular, the UDP/raw IP layer of the active board processes an intact packet that arrives via the standby board;

in block 407, sending an asynchronous message,

In particular, after an intact packet is processed, the UDP or the raw IP layer of the active board sends an asynchronous message to the application to notify that the next packet to be read is the intact packet that arrives via the standby board;

in block 408, reading an intact packet,

In particular, the application reads an intact packet;

in block 409, backuping the data,

In particular, after reading an intact packet that arrives at the active board via the standby board, the connectionless application backs up all the packets to ensure that the states of the applications in the standby board and the active board are consistent with each other;

in block 410, notifying the Packet has been processed,

In particular, the connectionless application notifies the socket layer that an intact packet has been processed by setting a socket option;

in block 411, sending a peer packet,

In particular, the socket layer of the standby board sends the peer packet in the socket layer receiving buffer to the application; the application may ignore the first packet; if the data are in the receiving buffer, the socket layer in the standby board sends an asynchronous message to notify the application to read the data; and from now on, the buffer in the standby board starts to deliver the peer packet to the application; and in block 412, backuping and sending, In particular, the buffer of the active board backs up the data to the buffer of the standby board, and the active board application sends data to the socket.

This embodiment provides the packet backup for an UDP/raw IP application.

Figure 5:
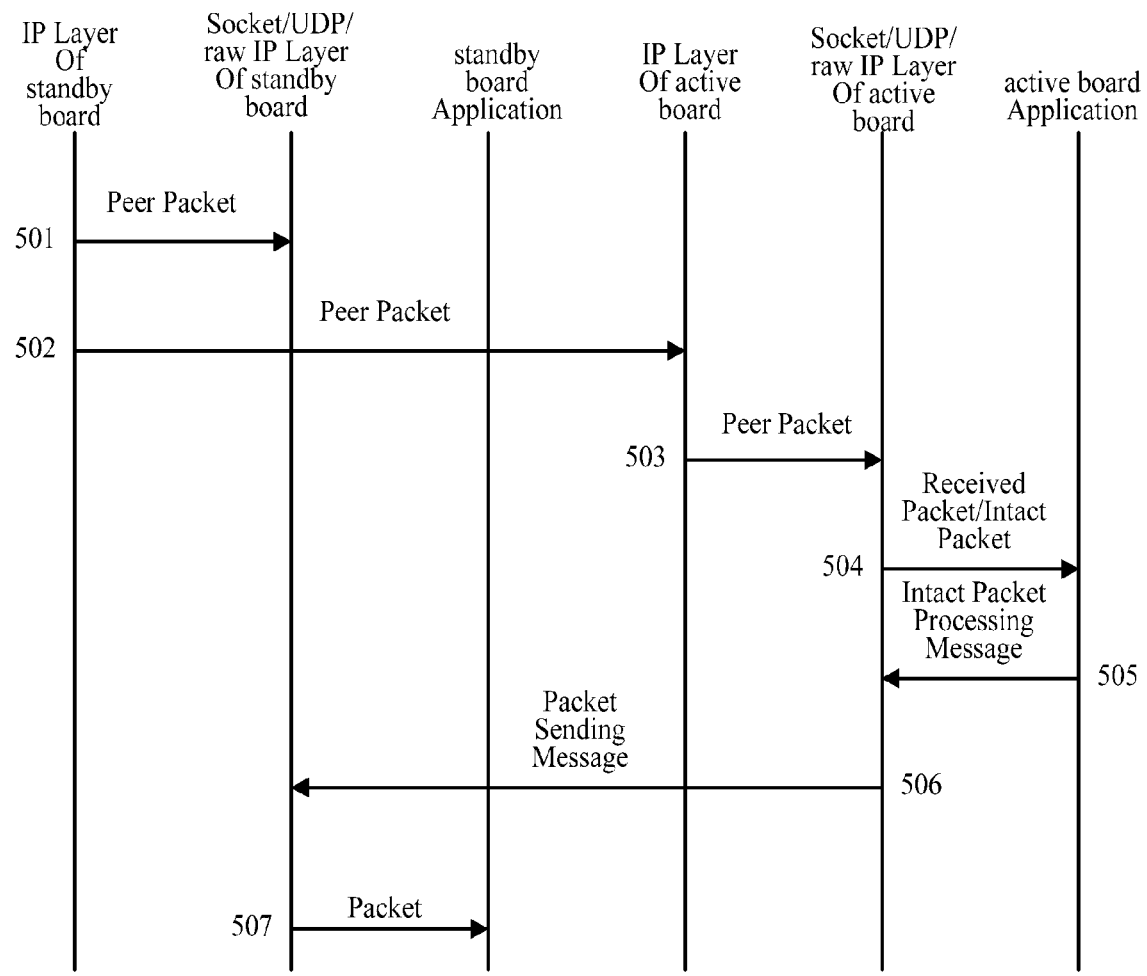
FIG. 5 is a signaling flow chart of the method for synchronization of a packet according to the third embodiment of the disclosure

Referring to FIG. 5, the signaling process for connectionless synchronization of a packet will now be described, in particular, In block 501, the IP layer of the standby board sends a peer packet to the socket/UDP/raw IP layer of the standby board;

In block 502, the IP layer of the standby board sends the peer packet to the IP layer of the active board;

In block 503, the IP layer of the active board sends the peer packet to the socket/UDP/raw IP layer of the active board;

In block 504, the socket/UDP/raw IP layer of the active board sends the received packet and the intact packet to the active board application;

In block 505, after an intact packet is processed, the active board application feeds back an intact packet processing message to the socket/UDP/raw IP layer of the active board;

In block 506, the socket/UDP/raw IP layer of the active board sends a packet delivery message to the socket/UDP/raw IP layer of the standby board; and In block 507, the socket/UDP/raw IP layer of the standby board sends the packet to the standby board application.

The detailed process is as follows,

After finishing a batch of synchronous boundary decision, an interface board sends a peer packet to the standby board. The peer packet may be delivered to the standby board from the interface board; the IP layer in the standby board may duplicate and deliver the packet to the IP layer in the active board; and the IP layer in the standby board may also deliver the packet to the UDP/raw IP layer. The UDP/raw IP layer in the standby board may put the received packet into a reassembly queue without sending any asynchronous signal to notify the application that a new packet arrives.

The IP layer in the active board delivers the packet to the UDP/raw IP layer. The UDP/raw IP layer in the active board may put the received packet into a reassembly queue, and then send a synchronous notification to notify the application that a new packet arrives. The UDP/raw IP layer in the active board sends an asynchronous notification to the application after processing the intact packet that arrives via the standby board. This notification declares that the next packet to be read is the intact packet that arrives via the standby board.

After an intact packet that arrives at the active board via the standby board is read, the connectionless application should make a synchronization of all the packets till this point to ensure the states of applications in the standby board and the active board are consistent.

With this assurance, the connectionless application notifies the socket layer that an intact packet has been processed by setting a socket option. During the processing of the socket option, the socket layer in the active board may notify the socket layer in the standby board that an intact packet has been processed.

The socket layer in the standby board delivers the peer packet in the socket receiving buffer to the application. The application may ignore the first packet. If the data are in the receiving buffer, the socket layer in the standby board may send an asynchronous message to notify the application to read the data. Then, the buffer in the standby board starts to deliver the peer packet to the application.

The above embodiments are used for illustrating and explaining the principle of the present disclosure. It shall be understood by those skilled in the art that the embodiments of the present disclosure are not limited to these; accordingly, various modifications and variations may be made without departing from the spirit or scope of the present disclosure as defined by the appended claims and their equivalents.

What is claimed is:

1. A method for synchronization of packets, comprising:
receiving, by a standby board, a peer packet from an interface board;
duplicating, by the standby board, the peer packet to an active board;
processing, by the active board, the peer packet; and
backing-up, by the active board, a processed peer packet to the standby board via a buffer;
wherein duplicating, by the standby board, the peer packet to the active board comprises:
  duplicating the peer packet in an Internet Protocol(IP) layer of the standby board to an IP layer of the active board; and
  duplicating, by the IP layer of the active board, the peer packet to a Transmission Control Protocol (TCP) layer of the active board and storing the peer packet into a reassembly queue.

2. The method according to claim 1, wherein the method further comprises:
extracting, by the active board, corresponding packet from the buffer after receiving an acknowledgment from the standby board, and sending the corresponding packet.

3. The method according to claim 1, wherein processing, by the active board, the peer packet comprises:
processing, by the Transmission Control Protocol (TCP) layer of the active board, an intact packet from standby board;
selecting and recording a larger sequence number of a sequence number of a next packet and a maximum sequence number of the peer packet in the reassembly queue; and
notifying, by the Transmission Control Protocol (TCP) layer of the active board, a Transmission Control Protocol (TCP) layer of the standby board to send the peer packet starting from the larger sequence number.

4. The method according to claim 3, further comprising:
sending, by the Transmission Control Protocol (TCP) layer of the standby board, the peer packet starting from the larger sequence number to an application, after the active board processes the peer packet; and
discarding the peer packet of which the sequence number is less than the larger sequence number recorded.

5. The method according to claim 1, further comprising:
synchronizing data on the standby board and the active board before the standby board receives the peer packet from the interface board.

6. The method according to claim 5, wherein synchronizing data on the standby board and the active board comprises:
duplicating all the data on the active board in batches to the standby board.

7. The method according to claim 1, wherein backing-up the processed peer packet from the active board to the standby board comprises:
sending, by the active board buffer, data of the peer packet to the standby board buffer.

8. The method according to claim 1, wherein backing-up the processed peer packet comprises sending the processed peer packet to the buffer and then sending the processed peer packet to the standby board from the buffer.

9. A method for synchronization of packets, comprising:
receiving, by a standby board, a peer packet from an interface board;
duplicating, by the standby board, the peer packet to an active board;
processing, by the active board, the peer packet; and
backing-up, by the active board, a processed peer packet to the standby board via a buffer;
wherein duplicating, by the standby board, the peer packet to the active board comprises:
  duplicating the peer packet in an IP layer of the standby board to an IP layer of the active board; and
  duplicating, by the IP layer of the active board, the peer packet to a User Datagram Protocol (UDP) or a raw IP layer of the active board and storing the peer packet into a reassembly queue.

10. The method according to claim 9, wherein processing, by the active board, the peer packet comprises:
processing, by the UDP or the raw IP layer of the active board, an intact packet from the standby board;
sending an asynchronous message to an application to notify that a packet to be read next is the intact packet;
backing-up, by the application, data of the peer packet after reading the intact packet; and
notifying, by the UDP or the raw IP layer of the active board, a UDP or a raw IP layer of the standby board that the peer packet has been processed.

11. The method according to claim 10, further comprising:
sending, by the UDP or the raw IP layer of the standby board, the peer packet in an interface buffer to the application after the active board processes the peer packet.

12. A system for synchronization of a packet, comprising an active board and a standby board, wherein:
a buffer is provided in the active board and the standby board respectively, for caching packet data between the active board and the standby board;
the standby board is adapted to receive a peer packet from an interface board and duplicate the peer packet to the active board; and
the active board is adapted to process the peer packet duplicated from the standby board, backup the processed peer packet to the standby board via the buffer of the active board;
wherein the peer packet is an Internet Protocol (IP) layer packet; wherein the standby board duplicates the peer packet in an IP layer of the standby board to an IP layer of the active board; and
wherein the active board duplicates the peer packet from the IP layer of the active board to a Transmission Control Protocol (TCP) layer or a User Datagram Protocol (UDP) layer of the active board and stores the peer packet into a reassembly queue.

13. The system according to claim 12, wherein the peer packet is an Internet Protocol (IP) layer packet;
wherein the Transmission Control Protocol layer of the active board processes an IP layer packet from the standby board;
wherein the active board selects and records a larger sequence number of a sequence number of a next packet and a maximum sequence number of the peer packet in the reassembly queue; and
wherein the active board notifies the standby board to send the peer packet starting from the larger sequence number.

* * * * *